United States Patent [19]

Stuart

[11] E Patent Number: Re. 33,350

[45] Reissued Date of Patent: Sep. 25, 1990

[54] SKI BINDING HAVING PRESET MEANS AND DETENT TRIGGER FOR SAID PRESET MEANS

[76] Inventor: David H. Stuart, 6203 Cornell St., Amarillo, Tex. 79109

[21] Appl. No.: 105,287

[22] Filed: Dec. 19, 1979

Related U.S. Patent Documents

Reissue of:

[64] Patent No.: 4,063,752
Issued: Dec. 20, 1977
Appl. No.: 677,787
Filed: Apr. 16, 1976

[51] Int. Cl.[5] ..... A63C 9/086
[52] U.S. Cl. ..... 280/624; 280/634
[58] Field of Search ..... 280/624, 625, 613, 611, 280/634, 631, 632, 626, 627

[56] References Cited

U.S. PATENT DOCUMENTS 3,771,806 11/1973 Hinterholzer et al. ..... 280/625 X
3,797,841 3/1974 McAusland ..... 280/624

FOREIGN PATENT DOCUMENTS 2269982 12/1975 France ..... 280/631

*Primary Examiner*—David M. Mitchell
*Attorney, Agent, or Firm*—Townsend and Townsend

[57] ABSTRACT

A snap lock modification which can be applied to various types of present day releasable ski bindings in which one component of the binding is connected to or forms a part of a ski boot and the other component is attached to the ski. One of the components includes latch means movable from inoperative position to latching position in engagement with a receiver formation on the other component. A resilient force unit is adjustable after the boot is in place to yieldingly urge the latch means into engaging position to retain the boot in position during normal maneuvers and to release the boot in response to excessive loads produced during a fall. The modification provides a detent trigger which restrains the action of the loaded force unit and which is actuatable upon placing the boot in skiing position to release and allow the latch means to snap into latching engagement with the receiver formation.

30 Claims, 2 Drawing Sheets

SKI BINDING HAVING PRESET MEANS AND DETENT TRIGGER FOR SAID PRESET MEANS

Matter enclosed in heavy brackets [ ] appears in the original patent but forms no part of this reissue specification; matter printed in italics indicates the additions made by reissue.

BACKGROUND OF THE INVENTION

This invention lies in the field of bindings for snow skis and is directed to apparatus for facilitating the attachment of skis to ski boots. It is more particularly directed to apparatus for pre-loading the latch means of the binding and restraining it until the boot is set in position and releasing it to snap into latching position.

Since skiing has become increasingly popular throughout the world, many different types of ski bindings have been proposed and put into use. Early bindings were simple straplike devices which provided a rather unreliable connection between boot and ski with frequent separation on bumps and hard turns. Such bindings were gradually improved until the connection was adequately secure. However, this raised a different problem. In the event of a fall, the skis would not release and tangling of the skis and digging into the snow frequently caused severe leg and ankle injuries.

This problem was overcome by the modern types of releasable heel and toe bindings in which the toe of the boot fits into a toe cap and the heel is clamped by a latch which is spring pressed against the boot heel or some abutment attached to it. The force of the spring pressure is adjustable to accommodate skiers of different weights and skills. The spring load is sufficient to prevent separation during normal maneuvers but yields to the excessive force generated in a fall and releases the ski. Another type achieves the same general results but utilizes side clamps swinging laterally to grip the side edges of a plate attached to the sole of the boot. Usually the loading spring or force unit is located just behind the aft end of the boot. Since it must be adjusted from no-load to loading condition after the boot is in position the skier must stoop and bend awkwardly to reach the unit and adjust it. This is not too difficult at a suitable location at the top of a slope but when a skier has fallen in mid slope and is replacing his skis while attempting to maintain his balance on a steep incline it becomes very difficult.

Several heel and toe types bindings have been proposed which permit a skier to step into the binding and cause it to clamp automatically by forcing a lever on the apparatus to lower under the boot heel and cause the entire mechanism to swing against an over center spring arrangement. This requires an undesirably high degree of force to be exerted when the skier is in a delicately balanced position, and it also calls for a multitude of links, levers, cams and springs, all of which adds to the cost and likelihood of damage or failure.

SUMMARY OF THE INVENTION

The device of the present invention overcomes the difficulties mentioned above and provides a simple and reliable means to provide snap lock actuation of a ski binding and obviate the need for stooping and bending in the process of attachment. While the device was developed for a particular one of the types mentioned above, its principles may be incorporated in almost any type of spring loaded binding.

Generally stated the invention is incorporated in a binding which includes a substantially rigid latch receiving member provided with at least one latch receiver formation and a substantially rigid latch mounting body. A pair of latch means are carried by the body to move laterally to engage the latch receiver formation. A resilient force unit is carried by the body and is adjustable between a no-load condition and a loading condition and it is connected to the latch means by link means to transmit the urging of the force unit to the latch means on occasion. A binding of this type is disclosed in U.S. Pat. No. 3,606,370 issued to Richard G. Spademan Sept. 20, 1971.

A detent trigger is mounted on the body and is movable between a first interfering position and a second non-interfering position. It includes a detent portion and a contact portion and when it is in the first position the detent portion engages the link means to prevent it from moving to latching position. It is spring biased to automatically move into this interfering position when the force unit is ajusted to no-load condition, after which the force unit is again adjusted to loading condition. At this time the contact portion is exposed and is actuated by the skier upon placing his boot on the ski in skiing position to withdraw the detent portion and allow the latch means to snap into engagement with the latch receiver formation.

In a preferred form the latch mounting body includes a sole plate having a recess in its under side extending in a fore and aft direction and the link means is an elongate link slidably mounted in the recess and having an elongate longitudinal slot therethrough from top to bottom. The forward portion of the link engages the latch means to move them laterally in and out, and the aft end of the link is connected to the force unit. An aperture is formed in the sole plate directly above the slot. The trigger includes a contact portion vertically movable in the slot and the aperture and a detent portion at the lower end of the contact portion extending forwardly and slidable vertically into and below the slot. When the force unit is in no-load condition a spring pushes the detent portion up into the slot with its forward end in contact with the forward end of the slot, and the contact portion extends above the upper surface of the sole plate. The force unit is again adjusted to loading condition and the apparatus is ready to be secured. When the skier places his boot in skiing position and applies his weight, the boot sole presses the contact portion down and the detent is lowered out of the slot. The link is released and moves rearward in response to the force of the force unit, moving the latch means into latching engagement. The detent trigger does not in any way interfere with the normal automatic releasing action of the binding.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
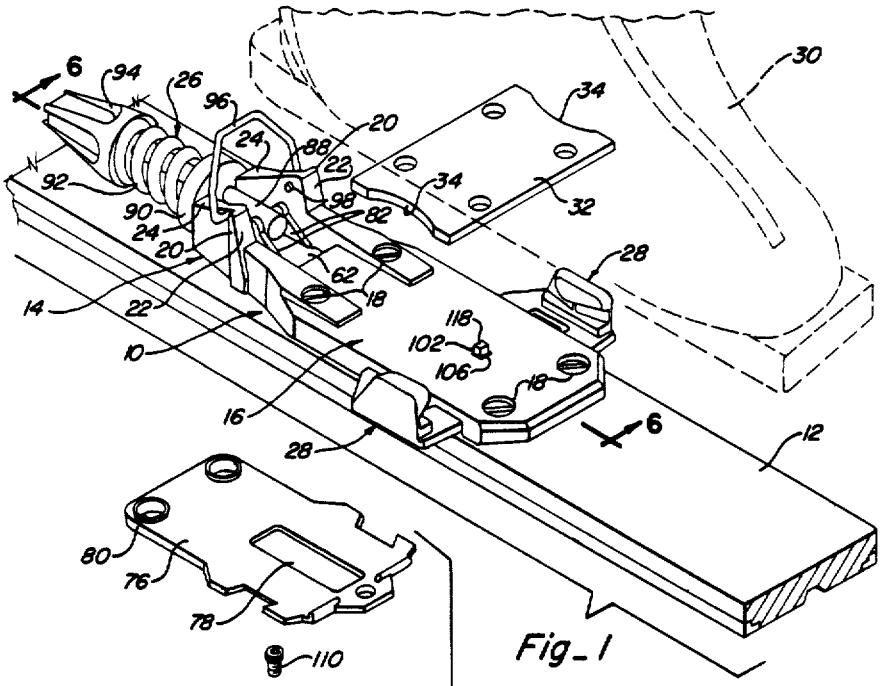
FIG. 1 is a perspective view of the total binding assembly with the ski boot about to be secured in place.

The ski binding incorporating the features of the invention is generally illustrated in FIG. 1, in which a latch mounting body 10 is carried by a ski 12. The body includes an aft heel stop and camming section 14 and a forwardly extending section 16 comprising a sole plate which is fixedly secured to the ski by screws 18. The aft section 14 includes two laterally spaced standards 20, each of which has a forward heel guiding surface 22 to assist in longitudinally locating the boot as it is placed in skiing position and upper and aft camming surfaces 24 to be used in loading the resilient force unit 26. Latch members 28 are movably mounted in the sole plate section of the body to move laterally in and out to secure or release the boot 30. Each boot is provided with a laterally extending boot plate 32 secured to the boot by screws, not shown, and formed at its marginal edges with latch receiver formations 34 which are engaged and gripped by the latch means when they are moved inward.

Figure 2:
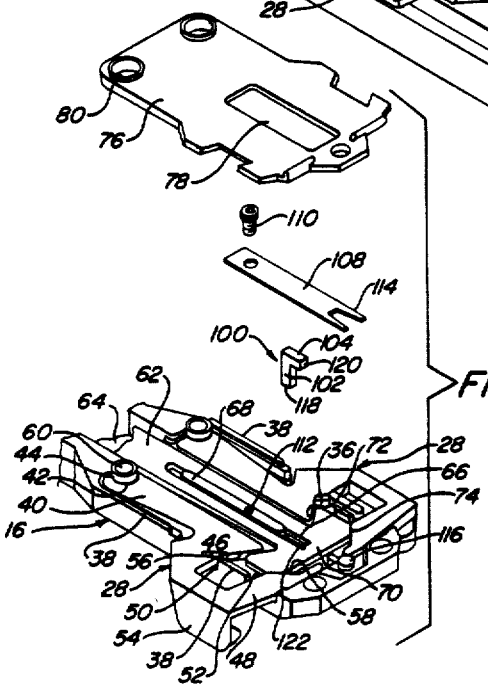
FIG. 2 is an inverted exploded view in perspective of the latching component of the binding.
Figure 3:
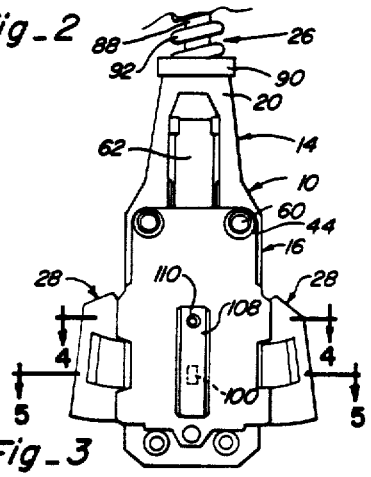
FIG. 3 is a bottom plan view of the latching component.

The construction, mounting, and actuation of the latch means is illustrated in the inverted exploded view shown in FIG. 2. The under side of the sole plate is formed with a large recess 36 having an upright interrupted side wall 38. Each latch means 28 includes a lever arm 40 with an aperture 42 at its aft end for pivotal mounting on a pivot post 44 which has a central aperture 60 for passage of one of the mounting screws 18. The forward portion of each arm extends outward and back in to define a generally U-shape in planform, providing webs 46 and 48 guided in cutaway portions 50 and 52 in side wall 38, with an upstanding gripping jaw 54 formed at the base of each U. The inner ends of each U are formed with cam surfaces 56 and 58 which are angled inwardly and forwardly.

The link means connecting the force unit to latch means 28 comprises an elongate link 62 slidably mounted for fore and aft movement in longitudinal recess 64 which extends below the basic recess 36. The link is provided with an elongate slot 66 to fit over and be slidably guided by elongated guiding and mounting rib 68 which extends up from the bottom of recess 64, and is formed at its forward end with a T-shaped head 70 having cam surfaces 72 and 74 at its outer ends which are angled inwardly and forwardly to mate with the cam surfaces 56 and 58 on the latch means. When the link moves forward it moves the latch means laterally outward and when it moves rearward it moves the latch means inward to engage formations 34 on the boot plate 32 and secure the boot to the ski. A cover plate 76 having an elongate aperture 78 near its forward end and two pilot apertures 80 at its aft end to fit onto pivot posts 44 seats within side wall 38 to retain the latching components in working position. It in turn is held in its proper position by contact with the upper surface of the ski when body 10 is secured to the ski.

Figure 6:
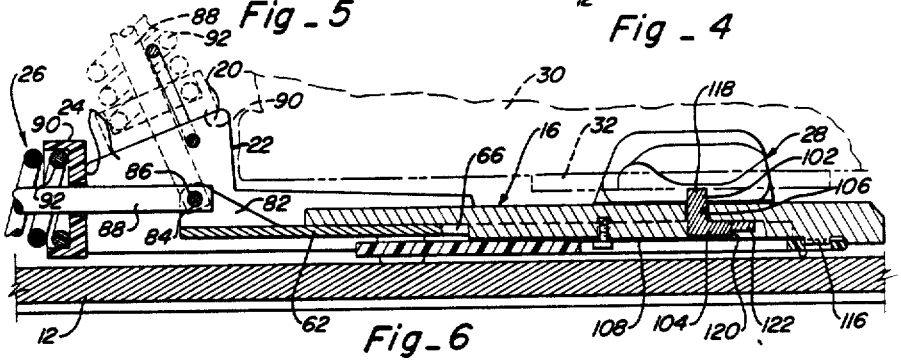
FIG. 6 is a sectional view taken on line 6—6 of FIG. 1 showing the linkage in restrained condition and the boot just above the trigger.

As seen in FIGS. 1 and 6, the aft end of link 62 is provided with a pair of upstanding laterally spaced ears 82 having apertures 84 to receive pivot pin 86. The force unit includes an elongate shank 88 pivotally mounted at its forward end on pin 86 and bearing threads on its aft end. A cup-shaped washer 90 is slidably mounted on the shank and receives the forward end of compression coil spring 92. Nut 94 is threaded on the aft end of the shank and may be adjusted to produce any desired degree of compression in the spring. A conventional bail 96 is pivotally connected to the standards at 98 to serve as an anchorage for a safety retriever line.

In the absence of the device of the present invention a skiier would adjust nut 94 to predetermined point which would provide the desired degree of compression, with the force unit in the position indicated by the broken lines in FIG. 6. Link 62 would be in its forward, or free, position and the spring would be substantially under no compression with washer 90 resting on upper camming surfaces 24. The skiier would place his boot on the sole plate and then swing the force unit down to the horizontal position. Since the lower camming surface 24 is at a greater distance from pivot point 86 than is the upper camming surface, the washer 90 would force rearwardly and compress spring 92, which would normally pull link 62 rearward to the position shown in FIG. 7, and the engagement of cam surface 72 with cam surface 56 would force gripping jaws 54 inward into latching engagement with the receiver formations 34.

Figure 5:
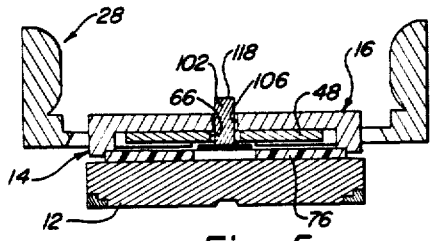
FIG. 5 is a sectional view taken on line 5—5 of FIG. 3.
Figure 4:
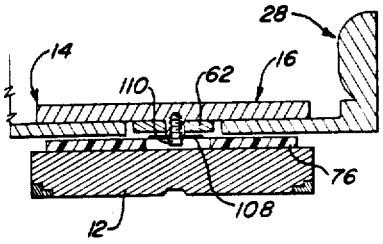
FIG. 4 is a sectional view taken on line 4—4 of FIG. 3.
Figure 7:
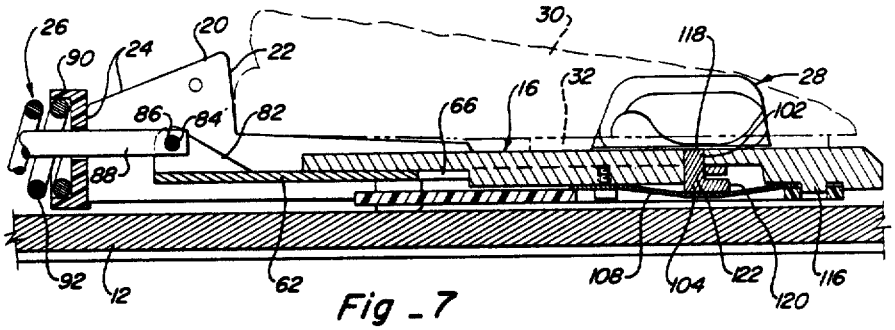
FIG. 7 is a view similar to FIG. 6 with the linkage released and the boot secure.

Returning to FIG. 2, the detent trigger 100 comprises a vertically directed contact portion 102 and a horizontally forwardly directed detent portion 104 connected to the lower end of the contact portion. The contact portion extends upwardly through the aperture 106 in the sole plate as seen in FIGS. 1, 5, and 6 and is vertically slidable therein, while the detent portion is movable vertically into and out of the forward portion of slot 66 in link 62 as can be seen in FIGS. 6 and 7. A leaf spring 108 is mounted on rib 68 by means of a screw 110 threaded into bore 112, and its forward forked end 114 straddles boss 116 of the sole plate to prevent lateral rotation. With cover plate 76 in place and body 10 secured to the ski, spring 108 is fixedly supported at its aft end and slidably supported at its forward end 114 and directly underlies detent portion 104. Its normally flat form yieldingly urges the trigger toward its upper position.

To operate the securing mechanism in accordance with the invention the force unit is swung upward to the broken line position shown in FIG. 6 with washer 90 resting on upper camming surfaces 24 and nut 94 properly adjusted but exerting substantially no compressive force on the spring at the moment. Link 62 is moved to its foremost free position and spring 104 pushes the trigger upward so that the upper end 118 of the contact portion 102 extends above the surface of the sole plate and the detent portion slides upward into the forward portion of slot 66 with its forward end 120 engaging the forward end 122 of the slot in interfering position to restrain the link against rearward motion to a latching position. The force unit 26 is then pushed downward and rearward to the solid line position shown in FIG. 6, the lower camming surfaces forcing washer 90 rearward and compressing spring 92 to loading condition so that the latch means is in effect cocked. This pre-setting can be accomplished with the ski held in the hand or lying free on the ground without the necessity for the skiier to stand with his boot in place on the ski and awkwardly twist and bend to activate the force unit.

After the mechanism is cocked the skiier lowers his boot into the position shown in FIG. 6 with the aft end in contact with heel guiding surfaces 22 and with the boot plate on the upper end 118 of contact portion 102. The spring loaded contact of the slot with the detent portion resists movement of the trigger under relatively low forces and prevents inadvertent actuation of the mechanism. When the boot is properly located in skiing position the skiier applies his weight and the boot plate forces the trigger down and moves the detent portion out of slot 66 and thus out of interfering position. The force unit snaps the link rearward which swings the latch means inward into latching engagement with receiver formations 34. The latching position is indicated in FIG. 7. It will be apparent that when the trigger is in non-interfering position the binding is free to operate in its normal manner including the function of automatically releasing the ski in response to the excessive forces of a fall.

It will be seen that the apparatus described above and illustrated in the drawings provides a very simple and easy means for accomplishing step-in latching at an extremely low cost and with no maintenance problems. The principles of construction and operation have been shown in connection with a particular type of binding but it will be obvious that they may be incorporated in many other types and variations without departing from the spirit of the invention.

What is claimed is:

1. A ski binding adapted to releasably secure a ski to an associated ski boot comprising:

a first binding component in the form of a substantially rigid latch receiving member provided with at least one latch receiver formation;

and a second binding component in the form of a substantially rigid latch mounting body;

one of said components being constructed for permanent connection to a ski boot and the other component being constructed for permanent connection to a ski;

latch means movably mounted on the body for movement between inoperative position substantially free of the latch receiving member and operative position in latching engagement with the receiver formation;

a resilient force unit carried by the body and adjustable between a no-load condition and a loading condition;

link means connecting the force unit to the latch means and movable to transmit the force of the force unit to the latch means to yieldingly urge the latter into operative position;

and a detent trigger mounted on the body and movable between a first interfering position engaging the link means to restrain it against movement in the latching direction in response to the urging of the force unit in loading condition and a second non-interfering position;

the trigger being settable in the first position to restrain the link means against latching movement and being actuatable by a skier upon placing his boot in skiing position on the ski to move to the second position and release the link means to allow it to move and transmit the force of the force unit to the latching means and yieldingly urge it into latching engagement with the receiver formation.

2. A binding as claimed in claim 1; in which the trigger is resiliently biased toward its first position and is automatically movable thereto when the force unit is in no-load condition to restrain the link means against movement in the latching direction in response to adjustment of the force unit to loading condition.

3. A binding as claimed in claim 1; in which the link means is slidably mounted within the body for fore and aft movement;

and the force unit is pivotally mounted on the aft portion of the body for swinging between no-load and loading condition.

4. A binding as claimed in claim 1; in which the latch means comprises a pair of latch members mounted in the body for lateral movement between free and latching positions;

the link means is slidably mounted in the body for fore and aft movement and engages the latch members to produce their lateral movement;

and the force unit is constructed and arranged to exert a rearwardly directed force on the link means when the force unit is in loading condition.

5. A binding as claimed in claim 1; in which the boot is provided with the latch receiver formation and the latch mounting body is fixedly secured to the ski;

and the link means is slidably mounted in the body for movement in a fore and aft direction.

6. A binding as claimed in claim 5; in which the trigger is actuated by contact with the boot as the latter is placed in skiing position.

7. A binding as claimed in claim 5; in which the latch mounting body includes a sole plate formed with a fore and aft recess in its under side;

the link means is an elongate link slidably mounted in the recess with its forward end in engagement with the latch means and its aft end connected to the force unit and formed with abutment means;

the trigger includes a contact portion and a detent portion to engage the abutment means on the link;

and the contact portion, when the trigger is in its first position, extends above the surface of the sole plate in a location to be depressed by the sole of the boot as it is placed in skiing position.

8. A binding as claimed in claim 7; in which the sole plate is provided with a generally vertically extending aperture;

and the contact portion of the trigger is generally vertically movable through the aperture.

9. A binding as claimed in claim 8; in which the abutment means comprises a recess in the link;

and the detent portion of the trigger moves vertically into and out of the recess.

10. A binding as claimed in claim 9; in which the recess comprises an elongate slot extending through the link and directed along its longitudinal axis;

the trigger includes a vertically disposed contact portion slidable in the aperture in the sole plate and in the slot in the link and a horizontally disposed forwardly extending detent portion connected to the lower end of the contact portion and slidable into and below the slot in the link;

and spring means is arranged below the detent portion and biased to urge it upwardly into the slot when the force unit is in no-load condition, with the forward end of the detent portion engaging the forward end of the slot to restrain the link against rearward movement as the force unit is adjusted to loading position;

the upper end of the contact portion extending above the upper surface of the sole plate when the detent portion is located in the slot;

the contact portion being adapted to be depressed by contact of the boot as it is placed in skiing position to force the detent portion downward out of the slot and release the link to allow it to move rearward in latching direction in response to the force exerted by the force unit.

11. A ski binding adapted to releasably secure a ski to an associated ski boot comprising:

a latch mounting body constructed to be fixedly attached to a ski;

latch means movably mounted on the body for movement between inoperative position substantially free of the boot and operative position in latching engagement with a receiver formation on the boot;

a resilient force unit carried by the body and connected to the latch means and adjustable between a no-load condition and a loading condition in which to yieldingly urge the latch means into operative position;

and a detent trigger mounted on the body and movable between a first interfering position to restrain the action of the force unit in loading condition and a second non-interfering position;

the trigger being settable in the first position to restrain the action of the force unit and being actuatable by a skier upon placing his boot in skiing position on the ski to move to the second position and release the force unit to allow it to urge the latch means into latching engagement with the receiver formation on the boot.

12. A binding as claimed in claim 11; in which the trigger is resiliently biased toward its first position and is automatically movable thereto when the force unit is in no-load condition to restrain the action of the force unit as it is adjusted to loading condition.

13. A binding as claimed in claim 11; in which the trigger is actuated by contact with the boot as the latter is placed in skiing position.

14. A binding as claimed in claim 11; in which the latch mounting body includes a sole plate;

the trigger includes a contact portion and a detent portion;

and the contact portion, when the trigger is in its first position, extends above the surface of the sole plate in a location to be depressed by the sole of the boot as it is placed in skiing position.

15. A binding as claimed in claim 14; in which the sole plate is provided with a generally vertically extending aperture;

and the contact portion of the trigger is generally vertically movable through the aperture.

*16. A ski binding adapted to releasably secure a ski to an associated ski boot rearward of the toe and forward of the rear of the heel of the ski boot comprising:*

*a first binding component in the form of a latch receiving member provided with at least one latch receiver formation; and a second binding component in the form of a latch mounting body;*

*one of said components being constructed for connection to a ski boot and the other component being constructed for connection to a ski;*

*latch means mounted on the body for actuation between an inoperative condition substantially free of the latch receiving member and an operative condition in latching engagement with the receiver formation;*

*a force unit;*

*link means connecting the force unit to the latch means to transmit the force of the force unit to the latch means; and*

*a trigger means operatively coupled to said latch means and actuatable between a first condition in which the trigger means causes the latch means to remain in its operative condition and a second condition in which the trigger means enables the latch means to change into its operative condition with the force of said force unit.*

*17. A ski binding according to claim 16 wherein said trigger means comprises a movable trigger member and said first and said second conditions comprise a first and a second position; and means for moving said movable trigger member between said first and said second positions.*

*18. A ski binding according to claim 16 wherein said trigger means is actuated by contact with said ski boot as said ski boot is placed in skiing position in said binding.*

*19. A ski binding according to claim 16 wherein said trigger means is mounted on said body and comprises means for engaging said link means to restrain movement of said link means in response to the urging of said force unit.*

*20. A binding according to claim 16 comprising means for moving said trigger means below the plane of the ski boot when said latching means engages said latch receiving member.*

*21. A ski binding according to claim 20 wherein said moving means comprises means for moving said trigger member in a generally vertical direction.*

*22. A ski binding adapted to releasably secure a ski boot to a ski rearward of the toe and forward of the rear of the heel of the ski boot comprising:*

*a first and a second engaging means;*

*means for attaching said first and said second engaging means to said ski boot and said ski;*

*a force unit for providing a clamping force; and*

*a step-in member movable relative to said first and said second engaging means in response to the placing of a ski boot in skiing position in said binding for engaging said first and said second engaging means with said clamping force.*

*23. A safety binding to hold a boot to a ski and comprising:*

*(a) a base plate secured to the ski;*

*(b) two jaws adapted to move in relation to said baseplate and arranged symmetrically on each side of the longitudinal axis of the ski, said jaws being designed to cooperate with the sides of the boot and being displaceable in the plane of the ski;*

*(c) a resilient means mounted on said baseplate and including*

*(i) a slide element mounted to move in translation in said baseplate and to cooperate with said jaws, in such a manner that the displacement of said slide corresponds to the opening or closing of said jaws; and*

*(ii) a spring means associated with the slide element and tending to retain the latter in a position corresponding to the closed jaws, the displacement of said slide occurring against the action of said spring means, said slide being adapted to move between a first position corresponding to the closing of said*

*jaws and a second position corresponding to the opening thereof; and*

*(d) a lock means on said baseplate engaging one of the elements of said resilient means when said slide is in its second position.*

*24. A binding according to claim 1, further comprising an element sensitive to the presence of the boot upon the ski, the action of said element ensuring the release of said element engaged by the lock when the ski is fitted to the boot.*

*25. A binding according to claim 24, wherein said element sensitive to the presence of the boot is retractable when the boot is in place upon the ski, said element therefore playing no part in intentional or safety releases.*

*26. A safety binding designed to hold a boot to a ski and comprising:*

*a baseplate secured to the ski;*

*two jaws adapted to move in relation to said baseplate and arranged symmetrically upon each side of the longitudinal axis of the ski, said jaws being designed to cooperate with the sides of the boot and being displaceable in the plane of the ski, and*

*a resilient element mounted upon said baseplate and including:*

*a slide adapted to move in translation in said baseplate and to cooperate with:*

*said jaws, in such a manner that the displacement of said slide corresponds to the opening or closing of said jaws, and a spring associated with the slide and tending to keep the latter in a position corresponding to the closed jaws, the displacement of said slide occurring against the action of said spring, and said slide being adapted to move between a first position corresponding to the closing of said jaws and a second position corresponding to the opening thereof,*

*said baseplate being equipped with a lock with which said slide engages when it its second position.*

*27. A binding according to claim 26, wherein said slide comprises a housing for cooperation with said lock.*

*28. A ski binding adapted to releasably secure a boot to a ski rearward of the toe and forward of the rear of the heel of the ski boot comprising:*

*a first and a second engaging means;*

*means for attaching the first and the second engaging means to the ski boot and the ski;*

*a force unit for providing a clamping force; and*

*a step-in member movable relative to the first and the second engaging means in response to the placing of a ski boot in skiing position in the binding for engaging the first and the second engaging means with the clamp force, the step-in member being located so that when the ski boot is moved into the skiing position the step-in member contacts and is actuated by a mid-sole portion of the boot.*

*29. A ski binding according to claim 28 wherein the engaging means is also located at about the mid-sole portion of the boot.*

*30. A ski binding according to claim 28 wherein the first engaging means is attached to the ski and comprises a jaw member operatively coupled with the force unit for engaging the second engaging means with the clamping force generated by the force unit; and wherein the second engaging means is attached to the ski boot at about said mid-sole portion so that the actuation of the step-in member by the ski boot requires a substantial alignment of the second engaging means with the jaw member.*

* * * * *